US005915664A

United States Patent [19]

Butler

[11] Patent Number: 5,915,664

[45] Date of Patent: Jun. 29, 1999

[54] OUTBOARD MOTOR STEERING ARM SUPPORT

[75] Inventor: Nathan Adam Butler, Forestville, Calif.

[73] Assignee: Keith Muramoto

[21] Appl. No.: 08/861,307

[22] Filed: May 19, 1997

Related U.S. Application Data

[60] Provisional application No. 60/040,322, Feb. 14, 1997.

[51] Int. Cl.[6] .......... F16M 1/00

[52] U.S. Cl. .......... 248/640

[58] Field of Search .......... 248/640, 642, 248/643, 296.1, 298.1, 285.1, 286.1, 279.1, 285.11, 287.1

[56] References Cited

U.S. PATENT DOCUMENTS

| | | | |
|---|---|---|---|
| 2,611,139 | 9/1952 | Ecklund | 5/505.1 |
| 2,858,690 | 11/1958 | Sanderson et al. | 70/58 |
| 3,242,899 | 3/1966 | Hanson | 440/62 |
| 3,561,393 | 2/1971 | Fortson | 440/7 |
| 3,941,072 | 3/1976 | Caton et al. | 440/62 |
| 4,426,055 | 1/1984 | Reedy et al. | 248/184.1 |
| 4,498,872 | 2/1985 | Shonley et al. | 440/63 |
| 4,654,014 | 3/1987 | Peirce et al. | 440/53 |
| 4,819,905 | 4/1989 | McCain | 248/642 |

*Primary Examiner*—Ramon O. Ramirez
*Assistant Examiner*—Anita M. King
*Attorney, Agent, or Firm*—Jack Lo

[57] ABSTRACT

An outboard motor steering arm support includes a rail attached to a stern of a boat, parallel to a common axis of the boat's steering arm and steering arm sleeve. One end of a sliding connector is slidably attached to the rail, and another end is fixedly attached to the distal end of the steering arm. The rail and sliding connector ensure precise alignment between the distal end of the steering arm and the axis of the sleeve at all times. Bending stresses on the steering arm are thus substantially eliminated. Therefore, the steering arm slides smoothly within the sleeve, and operator steering effort and mechanical wear are minimized.

10 Claims, 2 Drawing Sheets

OUTBOARD MOTOR STEERING ARM SUPPORT

CROSS REFERENCE TO RELATED APPLICATIONS

The present invention was previously disclosed in a provisional patent application Ser. No. 60/040,322 filed Feb. 14, 1997.

STATEMENT REGARDING FEDERALLY SPONSORED RESEARCH OR DEVELOPMENT

Not applicable.

BACKGROUND OF THE INVENTION

1. Field of the Invention

This invention relates generally to outboard motor steering mechanisms.

2. Prior Art

A typical marine outboard motor 10 is hingeably mounted to a stern of a boat, as shown in the rear perspective view in FIG. 1. One end of a link arm 12 is connected to the front of a motor 10, and another end is pivotally connected to the distal end of a steering arm 13, which is slidably positioned in a steering arm sleeve 14. The other end of steering arm 13 is connected to a steering cable (not shown), which is connected to a steering wheel (not shown). When the steering wheel is rotated, the steering cable moves steering arm 13 longitudinally within sleeve 14 in the directions indicated by arrows 16, link arm 12 moves in the directions indicated by arrows 15, and motor 10 moves in the directions indicated by arrows 17.

When steering arm 13 is moved, the load of motor 10 on the distal end thereof tends to bend it away from its axis in the directions indicated by arrows 18, particularly when it is fully extended from sleeve 14. The distal end of steering arm 13 also tends to bend in the vertical directions. The bending stresses cause steering arm 13 to tend to bind in sleeve 14. The binding in turn causes the operator to feel substantial resistance when turning the steering wheel, which hampers the handling of the boat. Furthermore, the sideways movements of steering arm 13 causes it and sleeve 14 to wear more quickly.

OBJECTS OF THE INVENTION

Accordingly an object of the present invention is to provide an outboard motor steering arm support that substantially eliminates bending stresses on the steering arm, so that operator steering effort and mechanical wear are minimized.

Further objects of the present invention will become apparent from a consideration of the drawings and ensuing description.

BRIEF SUMMARY OF THE INVENTION

An outboard motor steering arm support includes an elongated rail mounted on a transom, parallel to the common axis of the steering arm and the steering arm sleeve. One end of a sliding connector is slidably attached to the rail, and another end is fixedly attached to the distal end of the steering arm. The rail and sliding connector maintain the alignment between the distal end of the steering arm and the axis of the sleeve, so that the steering arm slides smoothly within the sleeve.

Figure 1:
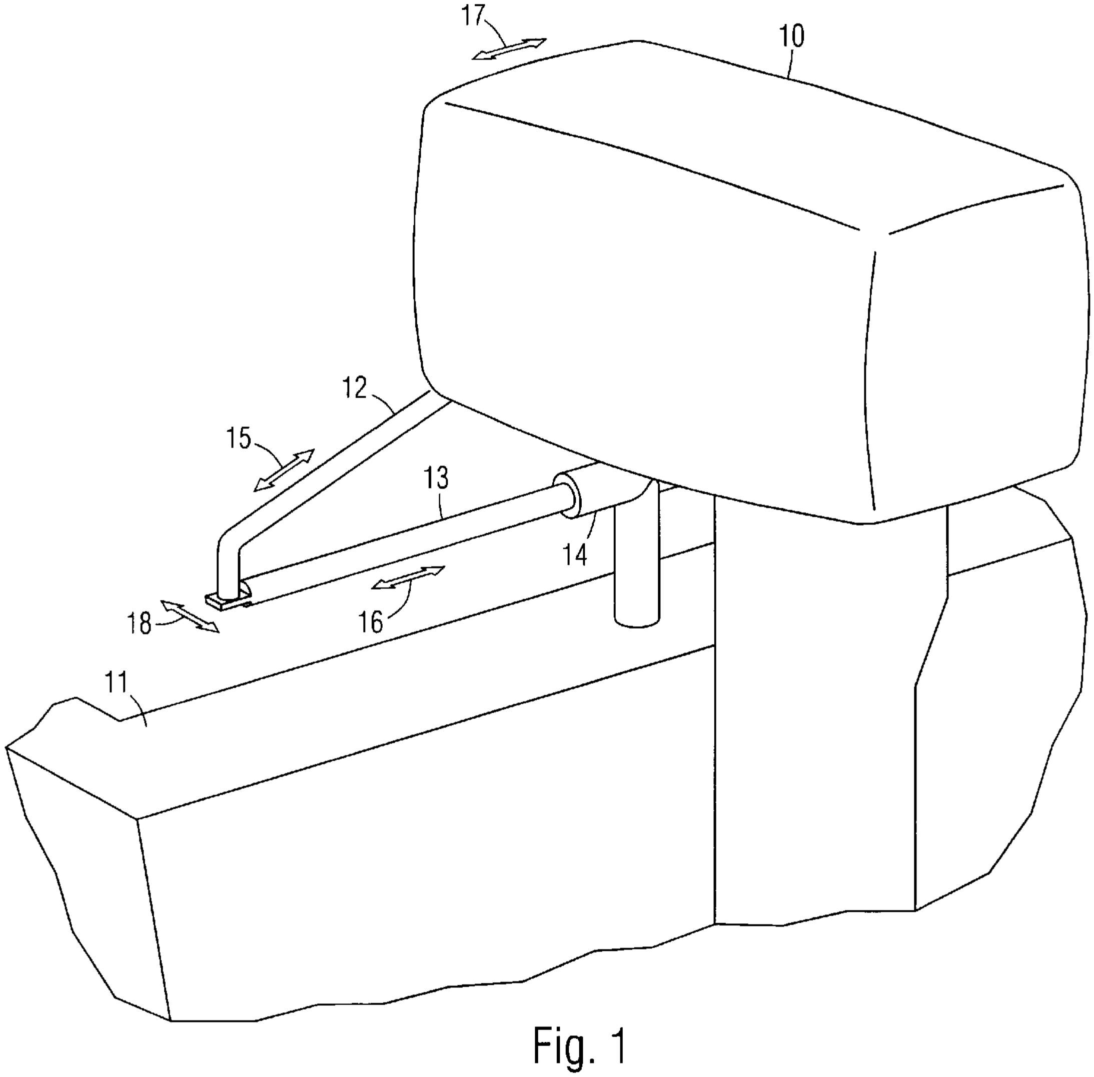
Fig. 1 Prior Art
FIG. 1 is a rear perspective view of a prior art outboard motor steering system.

| DRAWING REFERENCE NUMERALS | |
|---|---|
| 10. Outboard Motor | 11. Stern |
| 12. Steering Link | 13. Steering Arm |
| 14. Steering Arm Sleeve | 15. Arrows |
| 16. Arrows | 17. Arrows |
| 18. Arrows | 19. Rail |
| 20. Sliding Connector | 21. Connecting Arm |
| 22. Clamp | 23. Bracket |
| 24. Carriage | 25. Arrows |
| 26. Stops | 27. Bolt |

DETAILED DESCRIPTION OF THE INVENTION

Figure 2:
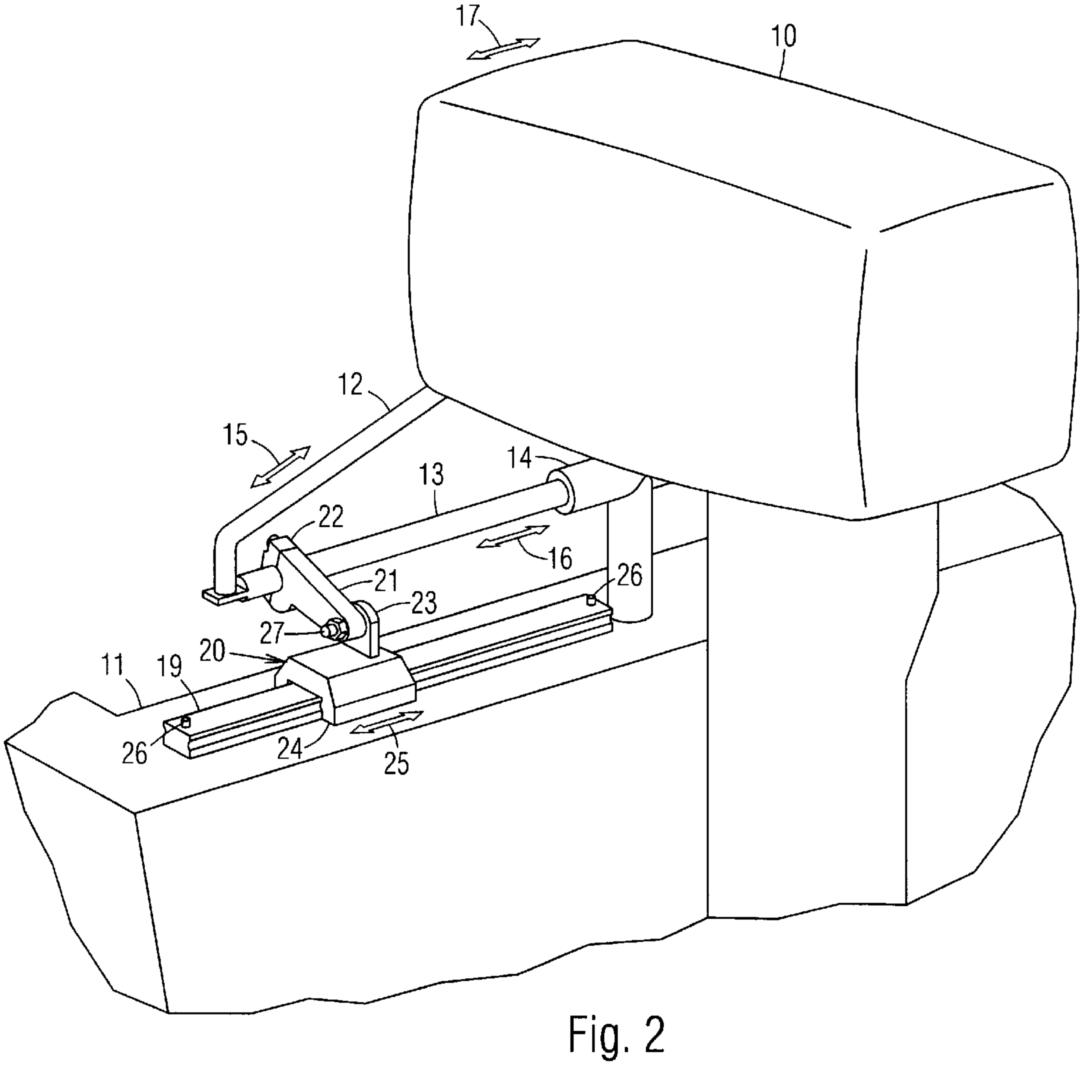
FIG. 2 is a rear perspective view of an outboard motor steering arm support in accordance with the present invention.

FIG. 2:

In accordance with a preferred embodiment of the invention shown in the rear perspective view in FIG. 2, an outboard motor steering arm support includes an elongated rail 19 fixedly mounted on an adjacent structure or stern 11 of a boat, parallel to the common axis of a steering arm 13 and a steering arm sleeve 14. A sliding connector 20 is connected between steering arm 13 and rail 19, and is movable in the directions indicated by arrows 25. Sliding connector 20 includes a connecting arm 21 with a clamp 22 at a distal end thereof fixedly attached to the distal end of steering arm 13. The proximal end of connecting arm 21 is pivotally attached by a bolt 27 to a bracket 23 extending from a carriage 24, which is slidably connected to rail 19. Carriage 24 preferably includes ball bearings (not shown) riding on rail 19 for smooth operation. Connecting arm 21 can be pivotally adjusted for attaching to steering arms of different heights. Bolt 27 is tightened to maintain connecting arm 21 in a desired position. A pair of stops 26 are arranged at opposite ends of rail 19.

In use, rail 19 and sliding connector 20 ensure precise alignment between the distal end of steering arm 13 and the axis of sleeve 14 at all times, even when steering arm 13 is fully extended. Bending stresses on steering arm 13 are thus substantially eliminated, so that it slides smoothly within sleeve 14.

SUMMARY AND SCOPE

Accordingly, I have provided an outboard motor steering arm support that substantially eliminates bending stresses on the steering arm, so that operator steering effort and mechanical wear are minimized.

Although the above descriptions are specific, they should not be considered as limitations on the scope of the invention, but only as examples of the embodiments. Many substitutes and variations are possible within the teachings of the invention. For example, the sliding connector may be structurally different, as long as it includes one end slidably connected to the rail, and another end fixedly connected to the steering arm. Other types of rails may be used. Other types of bolts or attaching devices may be used to attach the connecting arm to the carriage. Therefore, the scope of the invention should be determined by the appended claims and their legal equivalents, not by the examples given.

I claim:

1. A steering arm support for guiding an elongated steering arm of an outboard motor on a boat, said steering arm moving longitudinally within a sleeve attached to a stern of said boat, comprising:

- a rail for being attached to said stern of said boat in parallel with said steering arm;
- a carriage smoothly sliding along said rail in about a longitudinal axis of said rail;
- a connecting arm having one end attached to said carriage, said connecting arm being in a stable positional relationship with said carriage; and
- a clamp rigidly attached to an opposite end of said connecting arm in a fixed position, said clamp and said opposite end of said connecting arm cooperating to define a channel in a fixed parallel relationship with said rail, said channel for securely holding said steering arm and maintaining said steering arm in a fixed parallel relationship with said rail, thus maintaining alignment between a distal end of said steering arm and an axis of said sleeve for ensuring smooth sliding of said steering arm within said sleeve.

2. The steering arm support of claim 1, further including a bolt pivotally attaching said connecting arm to said carriage, said bolt enabling said connecting arm to be pivotally adjusted when loosened, said bolt maintaining said connecting arm in a desired rotational position when tightened.

3. The steering arm support of claim 1, wherein said rail includes a pair of opposite guide edges, said carriage engaging said opposite guide edges of said rail and thus being prevented from rotating about a longitudinal axis thereof.

4. The steering arm support of claim 1, wherein said carriage is comprised of a ball-bearing carriage smoothly sliding along said rail.

5. A steering arm support assembly for a boat, comprising:

- a sleeve for being attached to a stern of said boat;
- a steering arm slidably positioned within said sleeve;
- a link arm having one end connected to a distal end of said steering arm, and another end for being connected to an outboard motor of said boat;
- a rail for being attached to a stem of said boat, said rail being in a fixed parallel relationship to said steering arm; and
- a sliding connector having one end smoothly sliding along said rail, and another end with a channel in a fixed parallel relationship with said rail, said channel fixedly holding said steering arm therein and maintaining alignment between a distal end of said steering arm and an axis of said sleeve, and thus ensuring smooth sliding of said steering arm within said sleeve.

6. The steering arm support assembly of claim 5, wherein said sliding connector is comprised of a carriage smoothly sliding along said rail in a fixed rotational position about a longitudinal axis of said rail, a connecting arm having one end attached to said carriage, said connecting arm being in a stable positional relationship with said carriage, and a clamp rigidly attached to an opposite end of said connecting arm in a fixed position, said clamp and said opposite end of said connecting arm cooperating to define said channel in a fixed parallel relationship with said rail, said channel securely holding said steering arm and maintaining said steering arm in a fixed parallel relationship with said rail, thus maintaining alignment between a distal end of said steering arm and an axis of said sleeve to ensure smooth sliding of said steering arm within said sleeve.

7. The steering arm support assembly of claim 5, wherein said rail includes a pair of opposite guide edges, said sliding connector engaging said opposite guide edges of said rail and thus being prevented from rotating about a longitudinal axis of said rail.

8. The steering arm support assembly of claim 5, wherein said sliding connector is comprised of a ball-bearing sliding connector smoothly sliding along said rail.

9. A steering arm support assembly for a boat, comprising:

- a sleeve for being attached to a stern of said boat;
- a steering arm slidably positioned within said sleeve;
- a link arm having one end connected to a distal end of said steering arm, and another end for being connected to an outboard motor of said boat;
- a rail for being attached to a stern of said boat, said rail being in a fixed parallel relationship to said steering arm, said rail includes a pair of opposite guide edges;
- a carriage smoothly sliding along said rail, said carriage engaging said opposite guide edges of said rail and thus being prevented from rotating about a longitudinal axis of said rail;
- a connecting arm having one end attached to said carriage, said connecting arm being in a stable positional relationship with said carriage; and
- a clamp rigidly attached to an opposite end of said connecting arm in a fixed position, said clamp and said opposite end of said connecting arm cooperating to define a channel in a fixed parallel relationship with said rail, said channel securely holding said steering arm and maintaining said steering arm in a fixed parallel relationship with said rail, thus maintaining alignment between a distal end of said steering arm and an axis of said sleeve to ensure smooth sliding of said steering arm within said sleeve.

10. The steering arm support assembly of claim 9, wherein said carriage is comprised of a ball-bearing carriage smoothly sliding along said rail.

* * * * *